United States Patent [19]
Welland et al.

[11] Patent Number: 5,786,951
[45] Date of Patent: Jul. 28, 1998

[54] SAMPLED AMPLITUDE READ CHANNEL EMPLOYING A DISCRETE TIME NOISE GENERATOR FOR CALIBRATION

[75] Inventors: David R. Welland, Austin, Tex.; Richard T. Behrens, Louisville, Colo.; Iuri Mehr, Austin, Tex.

[73] Assignee: Cirrus Logic, Inc., Fremont, Calif.

[21] Appl. No.: 658,763

[22] Filed: Jun. 5, 1996

[51] Int. Cl.[6] .............................. G11B 5/09; G11B 5/035
[52] U.S. Cl. ................................................ 360/46; 360/65
[58] Field of Search ................................ 360/46, 51, 53, 360/65, 32; 341/131; 331/78

[56] References Cited

U.S. PATENT DOCUMENTS

| | | | |
|---|---|---|---|
| 4,125,898 | 11/1978 | DeHart et al. | 364/718 |
| 4,218,749 | 8/1980 | Babaud et al. | 364/717 |
| 5,121,260 | 6/1992 | Asakawa et al. | 360/53 |
| 5,121,263 | 6/1992 | Kerwin et al. | 360/53 |
| 5,189,418 | 2/1993 | Bartz et al. | 341/131 |
| 5,243,303 | 9/1993 | Murata et al. | 331/78 |
| 5,355,261 | 10/1994 | Taratoria | 360/53 |
| 5,392,295 | 2/1995 | Coker et al. | 371/21.2 |
| 5,539,403 | 7/1996 | Tani et al. | 341/44 |
| 5,585,974 | 12/1996 | Shrinkle | 360/46 |
| 5,592,587 | 1/1997 | Kunoff et al. | 395/2.73 |

OTHER PUBLICATIONS

Pablo A Ziperovich, "Performance Degradation of PRML Channels Due to Nonlinear Distortions" *IEEE Trans. on Magnetics*, vol. 27, pp. 4825–4827, Nov. 1991.

*Primary Examiner*—Aristotelis M. Psitos
*Assistant Examiner*—Regina Y. Neal
*Attorney, Agent, or Firm*—Howard H. Sheerin; Dan A. Shifrin

[57] ABSTRACT

This invention provides apparatus and a method to assist in calibrating a read channel in a magnetic data storage system. More particularly, the invention provides a read channel including a digital noise generator. During a calibration procedure, the digital noise generator injects an analog noise signal into the read channel, thereby increasing the read channel's bit-error rate, and consequently allowing rapid calibration of the read channel. The digital noise generator comprises a number of linear feedback shift registers that together generate a pseudo-random digital word sequence, and a digital-to-analog converter that converts the pseudo-random digital word sequence into the analog noise signal. The digital-to-analog converter comprises a plurality of one-bit digital-to-analog converters whose outputs are summed by an analog adder. This configuration causes the analog noise signal to exhibit a binomial probability distribution which is close to a normal probability distribution for a sufficiently large number of linear feedback shift registers. The linear feedback shift registers are driven by a clock that operates at a higher frequency than the rate at which data is processed in the read channel. The analog noise signal, therefore, has bandwidth that is wider than that of the data, thereby insuring that calibration of the read channel includes effects due to aliasing. The digital noise generator is disabled while the read head passes over synchronization marks and embedded servo wedges.

10 Claims, 9 Drawing Sheets

SAMPLED AMPLITUDE READ CHANNEL EMPLOYING A DISCRETE TIME NOISE GENERATOR FOR CALIBRATION

FIELD OF THE INVENTION

The present invention relates to magnetic storage systems for digital computers and, more particularly, to a read channel that uses a digital noise generator for channel calibration.

CROSS REFERENCES TO RELATED PUBLICATIONS

This application is related to the following co-pending U.S. patent applications:

Ser. No. 08/340,939 entitled "Channel Quality Circuit in a Sampled Amplitude Read Channel,"

Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control,"

Ser. No. 08/012,266 entitled "Synchronous Read Channel," now U.S. Pat. No. 5,424,887

Ser. No. 08/236,719 entitled "Method and Apparatus for Calibrating a PRML Read Channel Integrated Circuit," and Ser. No. 08/313,491 entitled "Improved Timing Recovery for Synchronous Partial Response Recording."

This application is also related to the following U.S. patents:

U.S. Pat. No. 5,359,631 entitled "Timing Recovery Circuit for Synchronous Waveform Sampling,"

U.S. Pat. No. 5,291,499 entitled "Method and Apparatus for Reduced-Complexity Viterbi-Type Sequence Detectors,"

U.S. Pat. No. 5,297,184 entitled "Gain Control Circuit for Synchronous Waveform Sampling," and U.S. Pat. No. 5,329,554 entitled "Digital Pulse Detector."

All of the above-named patent applications and patents are assigned to the same entity, and are all incorporated herein by reference.

BACKGROUND OF THE INVENTION

In magnetic storage systems for computers, a digital data sequence serves to modulate current in a read/write head coil in order to write a corresponding sequence of magnetic flux transitions onto the surface of a magnetic medium in concentric, radially spaced tracks at a predetermined baud rate. To read this recorded data, the read/write head again passes over the magnetic medium and transduces the magnetic transitions into pulses of alternating polarity in a continuous time analog read signal. These pulses are decoded by read channel circuitry to reproduce the digital data sequence.

Decoding the pulses into the digital data sequence can be performed by a peak detector in a conventional analog read channel. In such conventional peak detectors, analog circuitry, responsive to threshold crossing or derivative information, detects peaks in the continuous time analog read signal generated by the read head. The continuous time analog read signal is segmented into bit cell periods and interpreted during these bit cell periods. The presence of a peak during the bit cell period is detected as a "1" bit, whereas the absence of a peak is detected as a "0" bit.

As magnetic flux transitions are packed closer together on the magnetic medium in an effort to increase data density, adjacent pulses begin to overlap with one another, resulting in a type of distortion, known as intersymbol interference (ISI), in the read signal. Intersymbol interference can cause a peak to shift out of its bit cell, or to decrease in magnitude. This can lead to detection errors.

The most common detection errors occur when the bit cells are not correctly aligned with the pulses in the continuous time analog read signal. Timing recovery, then, adjusts the bit cell periods so that peaks of the continuous time analog read signal occur in the center of the bit cells on average in order to minimize detection errors. Since timing information is derived only when peaks are detected, the input digital data sequence is normally run length limited (RLL) to place an upper limit on the number of consecutive "0" bits.

The ISI effect can be reduced by decreasing the data density or by employing a coding scheme that places a lower limit on the number of "0" bits that occur between "1" bits. Thus, a compromise must be reached between the requirement to reduce ISI (which calls for a large number of consecutive "0" bits), and the need for timing recovery (which calls for a small number of consecutive "0" bits). A (d,k) run-length limited (RLL) code constrains the minimum number of "0" bits between "1" bits to be d, and the maximum number of consecutive "0" bits to be k.

Discrete time sequence detectors in sampled amplitude read channels can compensate for limited amounts of intersymbol interference and are less susceptible than analog peak detectors to channel noise. As a result, discrete time sequence detectors increase the capacity and reliability of the magnetic storage system, and they are therefore preferred over simple analog peak detectors.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

Sampled amplitude detection, such as partial response (PR) with Viterbi detection, allows for increased data density by compensating for intersymbol interference and the effect of channel noise. Unlike conventional peak detection systems that detect the presence or absence of a peak, sampled amplitude recording detects digital data by interpreting, at discrete time instances, the actual value of the pulse data.

To this end, the read channel includes a sampling device for sampling the analog read signal, a timing recovery circuit for synchronizing the samples to the baud rate (code bit rate), a low-pass analog filter to process the read signal before it is sampled so as to reduce the effects of aliasing, a digital equalizing filter to equalize the sample values according to a desired partial response after the signal has been sampled, and a discrete time sequence detector, such as a Viterbi detector, to interpret the equalized sample values in context to determine a most likely sequence for the digital data sequence (i.e., using maximum likelihood sequence detection). In this manner, a sampled amplitude read channel can take into account the effect of ISI and channel noise during the detection process, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See, for example:

Y. Kabal and S. Pasupathy, "Partial Response Signaling," *IEEE Trans. Commun. Tech.*, Vol. COM-23, pp. 921–934, September 1975;

E. A. Lee and D. G. Messerschmitt, "Digital Communication," Kluwer Academic Publishers, Boston, 1990; and G. D. Forney, Jr., "The Viterbi Algorithm," *Proc. IEEE*, Vol. 61, pp. 268–278, March 1973.

Applying sampled amplitude techniques to magnetic storage systems is also well documented. See, for example:

Cideciyan et al, "A PRML System for Digital Magnetic Recording," *IEEE Journal on Selected Areas in Communications*, Vol. 10, No. 1, pp. 38–56, January 1992;

Wood et al, "Viterbi Detection of Class IV Partial Response on a Magnetic Recording Channel," *IEEE Trans. Commun.*, Vol. COM-34, No. 5, pp. 454–461, May 1986;

Coker et al, "Implementation of PRML in a Rigid Disk Drive," *IEEE Trans. on Magnetics*, Vol. 27, No. 6, November 1991;

Carley et al, "Adaptive Continuous-Time Equalization Followed by FDTS/DF Sequence Detection," *Digest of the Magnetic Recording Conference*, Aug. 15–17, 1994, p. C3;

Moon et al, "Constrained Complexity Equalizer Design for Fixed Delay Tree Search with Decision Feedback," *IEEE Trans. on Magnetics*, Vol. 30, No. 5, September 1994;

Abbott et al, "Timing Recovery for Adaptive Decision Feedback Equalization of the Magnetic Storage Channel," Globecom '90, *IEEE Global Telecommunication Conference*, 1990, San Diego, Calif., November 1990, pp. 1794–1799;

Abbott et al, "Performance of Digital Magnetic Recording with Equalization and Offtrack Interference," *IEEE Trans. on Magnetics*, Vol. 27, No. 1, January 1991;

Cioffi et al, "Adaptive Equalization in Magnetic-Disk Storage Channels," *IEEE Communication Magazine*, February 1990; and R. Wood, "Enhanced Decision Feedback Equalization," *Intermag* '90.

Although sampled amplitude read channels provide an increase in data density and are therefore preferred over the analog peak detection schemes, they are more complex than their conventional counterparts. The performance and accuracy of complex systems such as sampled amplitude read channels depend on the performance and accuracy of each component therein. For instance, the accuracy of the sequence detector depends on how well the analog and digital filters equalize the pulses into an optimal shape, how well the automatic gain control circuit tracks the desired pulse amplitudes, and how well the timing circuitry synchronizes the sampling of the analog waveform. Additionally, to avoid the cost of customization, it is desirable that the read channel should be able work in many different storage systems.

Thus, for optimal operation, the components of a sampled amplitude read channel must be calibrated and tuned to the particular operating characteristics of the storage system. For example, the read channel can be tuned to operate according to the characteristics of a particular magnetic read head, to the particular height that the head operates above the storage medium, or to the particular speed at which the magnetic storage medium is moving. Also, the characteristics of the storage system and medium vary between each disk drive because there are slight but significant differences in manufacturing, and these characteristics may degrade over time. Therefore, the read channel must be tuned to the operating characteristics of a particular drive as well as to the characteristics of the magnetic storage medium.

A further consideration is that defects in the magnetic medium, caused by defective material, manufacturing, or operation, can degrade such that part of the magnetic medium is no longer useable. By detecting defects in the medium, the storage system is prevented from using that part of the medium so that failures are avoided.

Prior art methods and apparatus for calibrating sampled amplitude read channels generally include channel quality circuits incorporated into the read channel for directly measuring and accumulating performance data such as sample errors. Component parameters, such as filter coefficients, are adjusted in response to the performance data until certain criteria, such as minimum mean-square error (MSE) or minimum bit-error rate, are achieved. Such methods and apparatus are disclosed, for example, in U.S. Pat. No. 5,392,295 entitled "Error Measurement Circuit," and co-pending U.S. patent application Ser. No. 08/340,939 entitled "Channel Quality Circuit in a Sampled Amplitude Read Channel."

To measure the MSE, a known bit sequence is read from the magnetic medium to produce an actual sampled signal at the input of the Viterbi decoder. The same known bit sequence is applied to an ISI model of the channel to produce an ideal sampled signal. Unlike a binary sequence, the actual signal and the ideal signal are quantized to more than two levels (typically 63 levels). The MSE is measured by subtracting the actual signal from the ideal signal for the entire known bit sequence to produce a quantized error signal, and squaring and accumulating the quantized error signal. An estimate of the MSE is then given by the ratio of the accumulated squared error signal to the total number of bits in the known bit sequence.

Channel quality circuits used to measure MSE can be complicated and may require significant die area. Thus, several prior art techniques have calibrated read channels by minimizing the bit-error rate (BER) instead of the MSE. The BER is defined as the ratio of the number of bits detected incorrectly to the total number of bits detected. One way to measure the BER is to write a known test pattern to the disk and to compare it to the detected pattern when it is read back. Typically, the BER is low (e.g., $10^{-9}$), so in order to make a meaningful estimate of the BER, the total number of detected bits must be large (e.g, $10^{11}$).

To alleviate this problem, one prior art read channel employs a switchable on-chip analog noise source connected to the variable gain amplifier. When the noise source is switched on, the analog voltage is corrupted by additive noise, and the signal to noise ratio decreases. Consequently, the BER increases and fewer bits need to be read in order to make a low-variance estimate of the BER. An example of an analog noise source used to characterize (but not calibrate) a read channel is given in P. A. Ziperovich, "Performance Degradation of PRML Channels due to Nonlinear Distortion," *IEEE Transactions on Magnetics*, Vol. 27, No. 6, pp. 4825–4827, November 1991. However, the inclusion of the analog noise source has its own disadvantages.

The continuous-time read signal contains both data components and noise components. The noise components typically have three sources: media noise which is due to random orientations of magnetic domains in the magnetic medium; pre-amplifier noise; and variable-gain amplifier (VGA) noise. Generally, the media noise and pre-amplifier noise have comparable amplitudes, and the VGA noise is less significant. All three noise sources produce noise that has wide bandwidth and is substantially white. One purpose of the analog noise source is to mimic the noise component in the continuous-time read signal. Therefore, it too must produce noise that has a wide bandwidth and is substantially white.

More specifically, the noise should have a substantially flat spectrum, and should extend to a frequency that is high enough to insure that the read channel is calibrated to include any deleterious effects of aliasing. Sampling the continuous-time read signal produces a signal that has a periodic spectrum, with period equal to the sampling rate. In the present context, aliasing of the data components in the continuous-time read signal is not necessarily disadvantageous. However, aliasing of the noise components is disadvantageous. Therefore, the read channel must be calibrated to operate optimally regardless of the presence or absence of aliasing. This can be accomplished if the added noise has a bandwidth that is larger than the bandwidth of the analog receive filter.

Typically, in prior art circuits, the analog noise source is realized as a large gain amplifier that amplifies the thermal noise voltage present across a resistor. Typically, the amplifiers operate in open-loop mode; for stability and other reasons, feedback cannot be used. Such prior art noise sources have several disadvantages. One disadvantage is that it is difficult to produce integrated high-gain wideband amplifiers that have sufficiently low input offsets. If the input offset is not sufficiently small, the output of the amplifiers have undesirably large dc offsets. A second disadvantage is that it is difficult to produce integrated high-gain wideband amplifiers that have a required gain certainty. If the gain is uncertain, the amplitude of the added noise is uncertain.

Preferably, the noise signal used to corrupt the analog read signal should have a probability distribution that is substantially Gaussian.

It is a general aspect of the present invention to provide, in a sampled amplitude read channel, a means for generating a noise signal that may be used to corrupt the analog read signal enabling the BER to be measured in a reasonable time, such that the disadvantages of an analog noise generator are avoided.

It is a further aspect of the present invention to provide, in a sampled amplitude read channel, a digital noise source that generates a noise signal having a probability distribution that is controlled.

It is a further aspect of the present invention to provide, in a sampled amplitude read channel, a digital noise source that generates a noise signal having a substantially flat spectrum that extends beyond the highest frequency present in the filtered analog read signal.

SUMMARY OF THE INVENTION

The aspects of the present invention are achieved by incorporating, within a sampled amplitude read channel, a digital noise generator comprising a plurality of linear feedback shift registers and a digital-to-analog converter, the plurality of linear feedback shift registers producing a corresponding plurality of pseudo-random binary digit sequences, each pseudo-random binary digit sequence being fed to a corresponding input of the digital-to-analog converter to produce an analog noise signal, the analog noise signal being applied to an analog read signal in the read channel, thereby causing an increased bit-error rate to facilitate a simplified calibration method.

Preferably, within the digital-to-analog converter, each input of the digital-to-analog converter is coupled to a corresponding internal 1-bit digital-to-analog converter that produces a corresponding intermediate signal. The intermediate signals are combined to provide the analog noise signal such that the analog noise signal has an amplitude that has a substantially binomial probability distribution. As the number of inputs increases, the binomial distribution approaches a Gaussian distribution.

Each linear feedback shift register has a length that is different than the length of the other linear feedback shift registers within the noise generator such that the pseudo-random binary digit sequences have different periods, thereby causing the analog noise signal to have a period that is determined by the lowest common multiple of the periods of the pseudo-random binary sequences.

The linear feedback shift registers are initialized at least once, but are preferably not re-initialized between adjustments of the read channel.

The analog read signal has a bandwidth and is sampled at a sampling rate. The linear feedback shift registers are clocked at a clocking rate that is higher than the sampling rate such that the analog noise signal has a bandwidth that is at least as wide as the bandwidth of the analog read signal. This enables the calibration of the parameters of the read channel (in the presence of the analog noise signal) to incorporate the effects of aliasing due to sampling of the read signal. In the preferred embodiment, the clocking rate is twice the sampling rate.

The noise generator is preferably disabled until a synchronization mark on the magnetic storage medium is detected so that selected portions of the analog read signal are not corrupted by the analog noise signal. The noise generator is also preferably disabled as the read head passes over embedded servo wedges in the magnetic storage medium so that portions of the analog read signal corresponding to servo information are not corrupted by the analog noise signal.

BRIEF DESCRIPTION OF THE DRAWINGS

The above and other aspects and advantages of the present invention will be better understood by reading the following detailed description in conjunction with the drawings in which.

DETAILED DESCRIPTION OF THE PREFERRED EMBODIMENT

Sampled Amplitude Recording Channel

Figure 1:
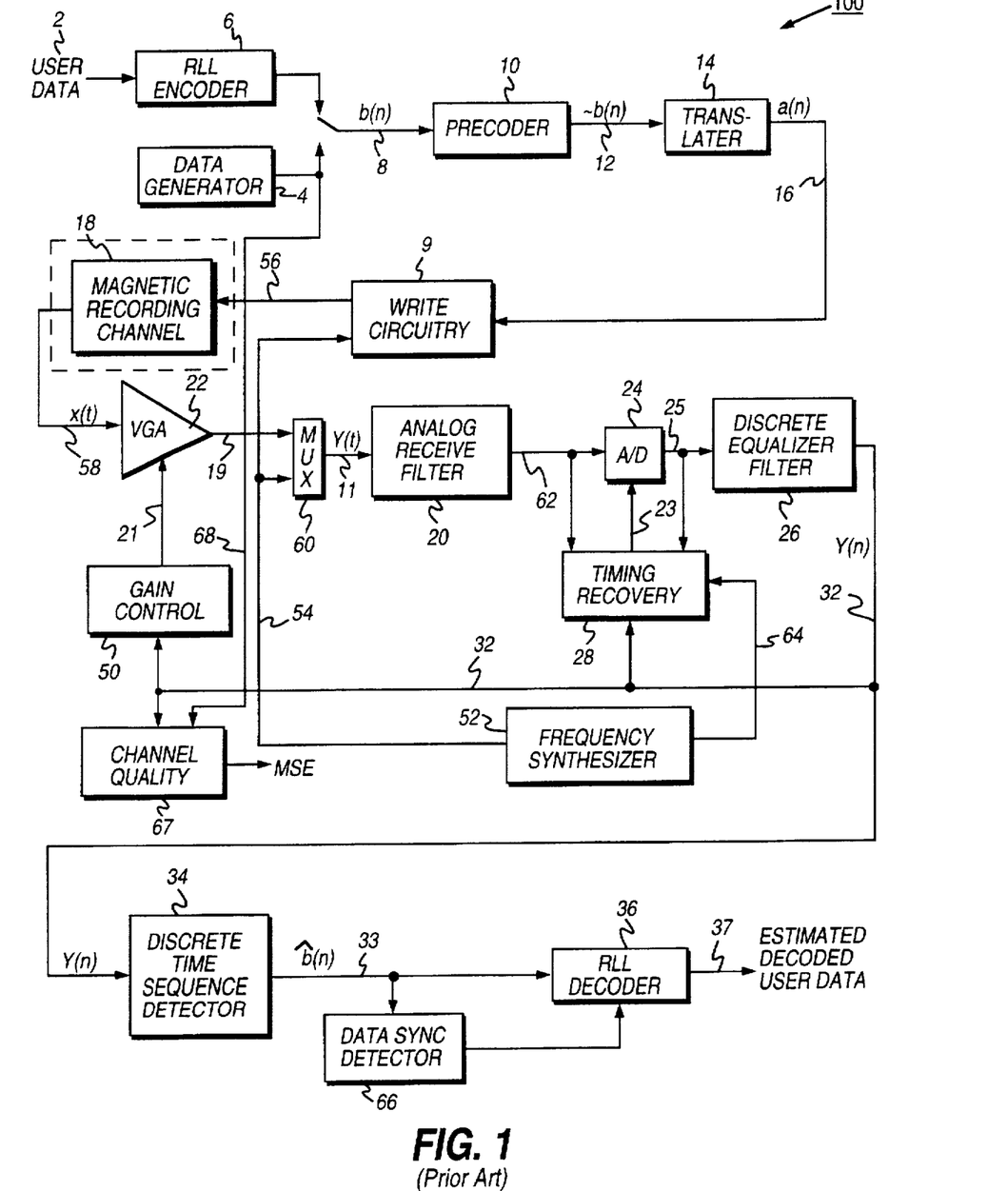
FIG. 1 is a block diagram of a conventional sampled amplitude read channel employing a channel quality circuit for calibration.

FIG. 1 shows a block diagram of conventional sampled amplitude read channel 100. During a write operation, either user data 2 or preamble data from data generator 4 is written onto the medium. RLL encoder 6 encodes user data 2 into binary sequence b(n) 8 according to a (d,k) RLL constraint. Precoder 10 precodes binary sequence 8 to compensate for the transfer function of magnetic recording channel 18 and equalizing filters to form precoded sequence ~b(n) 12. Magnetic recording channel 18 typically includes the magnetic recording medium, read/write heads, and a preamplifier that are usually not considered to be part of the read channel. The possible independence of the read channel and the magnetic recording channel is indicated by a broken line enclosing magnetic recording channel 18. Translator 14 translates precoded sequence 12 into symbols a(n) 16 according to the following rules: if ~b(N)=0 then a(N)=−1, and if ~b(N)=1 then a(N)=+1. Symbols 16 modulate the current in a recording head coil at a baud rate 1/T to record the binary sequence onto the magnetic medium.

When reading the binary sequence back, variable gain amplifier 22 adjusts the amplitude of analog read signal x(t) on line 58, and analog filter 20 provides initial equalization toward a desired response. Analog read signal Y(t) 11 is passed through analog receive filter 20. Sampling device 24 samples the output of analog filter 20. Discrete time filter 26 provides further equalization towards the desired response. Table 1 lists some examples from which the desired response may be selected for partial response recording.

Equalized sample values from discrete time filter 26 are applied over line 32 to gain control circuit 50 and timing control circuit 28 for adjusting the amplitude of the read signal and the frequency and phase of sampling device 24, respectively. Timing recovery adjusts the frequency of sampling device 24 over line 23 in order to synchronize equalized samples on line 32 to the waveform (see co-pending U.S. patent application Ser. No. 08/313,491 entitled "Improved Timing Recovery for Synchronous Partial Response Recording"). Frequency synthesizer 52 provides a write clock over line 54 to write circuitry 9, and a control signal over line 64 to timing recovery 28. Multiplexer 60 selects, as the input to analog receive filter 20, the write clock over line 54 so that timing recovery 28 can lock to an appropriate reference frequency before acquiring the preamble. Once timing recovery 28 has locked to the reference frequency, multiplexer 60 selects the output of the VGA over line 19 as the input to analog receive filter 20. Gain control circuit 50 adjusts the gain of variable gain amplifier 22 over line 21. Equalized samples Y(n) on line 32 are sent to discrete time sequence detector 34 (which may, for example, be a maximum likelihood (ML) Viterbi sequence detector) to detect estimated binary sequence b(n) on line 33. RLL decoder 36 decodes estimated binary sequence b(n) into estimated user data on line 37. In the absence of errors, estimated binary sequence b(n) is equal to recorded binary sequence 8, and decoded user data 37 is equal to recorded user data 2.

For optimal operation, the components of the sampled amplitude read channel should be calibrated and tuned to obtain substantially the best channel quality. Prior art read channel 100 includes channel quality circuit 67 which compares actual data from data generator 4 over line 68 with data from equalization filter 26 to measure and accumulate performance data such as mean-square error. Component parameters, such as filter coefficients, within the read channel are adjusted in response to the performance data until substantially the best channel quality is achieved.

Data Format

Figure 2A:
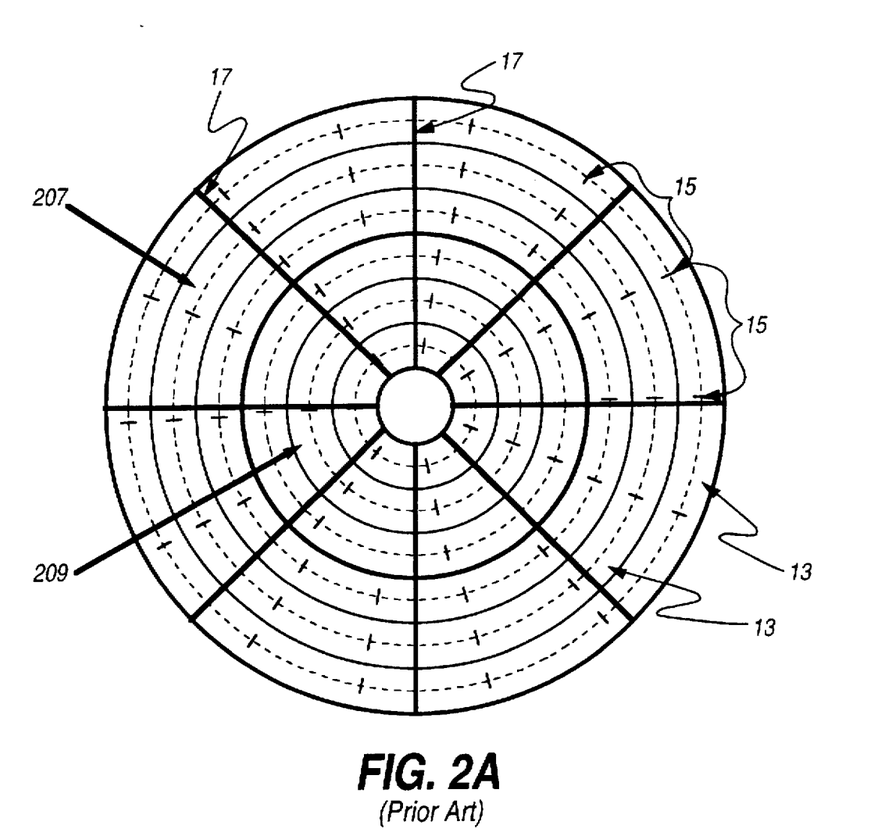
FIG. 2A shows an exemplary data format of a magnetic disk having a plurality of concentric tracks, each track comprising a plurality of user data sectors and embedded servo wedges.

FIG. 2A shows an exemplary data format of a magnetic medium comprising a plurality of concentric data tracks 13 wherein each data track comprises a plurality of sectors 15, and wherein a plurality of servo fields 17 are embedded in the sectors. A servo controller processes servo fields 17 to verify the track and sector position of the read/write head after the read signal has passed through VGA 22, multiplexer 19, and analog receive filter 20. Additionally, the servo controller processes servo bursts within servo field 17 to keep the head aligned over desired track 13 while writing and reading data. Like any other signal read from the magnetic medium, the servo bursts pass through VGA 22, multiplexer 19, and analog receive filter 20.

Figure 2B:
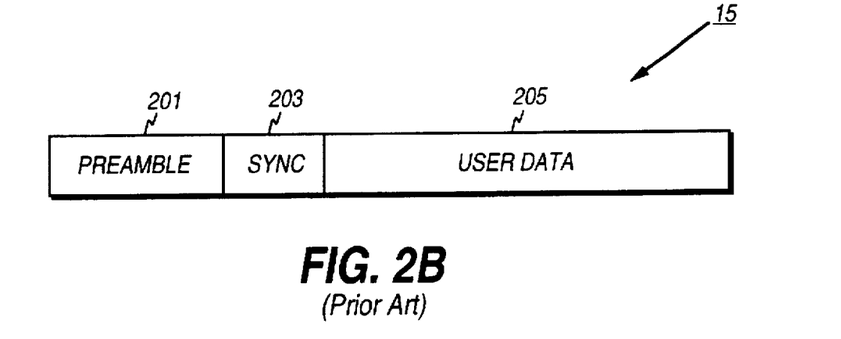
FIG. 2B shows an exemplary format of a user data sector.

FIG. 2B shows the format of sector 15, comprising acquisition preamble 201, synchronization mark 203, and user data 205. Timing recovery 28 processes acquisition preamble 201 to acquire the correct sampling frequency and phase before reading user data 205, and synchronization mark 203 demarcates the beginning of user data 205 (see co-pending U.S. patent application Ser. No. 08/313,491 entitled "Improved Timing Recovery for Synchronous Partial Response Recording").

To increase the overall storage density, the disk is partitioned into an outer zone 207 comprising fourteen data sectors per track, and an inner zone 209 comprising seven data sectors per track. In practice, the disk is actually partitioned into several zones and the data recorded and detected at varying data rates.

Read Channel Calibration

Channel quality circuits, such as circuit 67 in read channel 100, that are used to measure the MSE may be complicated and require a significant die area. Thus, several prior art techniques have calibrated read channels by minimizing the bit-error rate (BER) instead of the MSE. The BER is defined as the ratio of the number of bits detected incorrectly to the total number of bits detected. One way to measure the BER is to write a known test pattern to the disk and to compare it to the detected pattern when it is read back. Typically, the BER is low (e.g., $10^{-9}$), so, in order to make a meaningful estimate of the BER, the total number of detected bits must be large (e.g. $10^{11}$).

The severity of this problem has been reduced in the prior art by providing a switchable on-chip analog noise source connected to the variable gain amplifier. When the noise source is switched on, the analog voltage is corrupted by additive noise, and the signal to noise ratio decreases. Consequently, the BER increases, and fewer bits need to be read in order to make a low-variance estimate of the BER. An example of an analog noise source used to characterize (but not calibrate) a read channel is given in P. A. Ziperovich, "Performance Degradation of PRML Channels due to Nonlinear Distortion," *IEEE Transactions on Magnetics*, Vol. 27, No. 6, pp. 4825–4827, November 1991.

Figure 3:
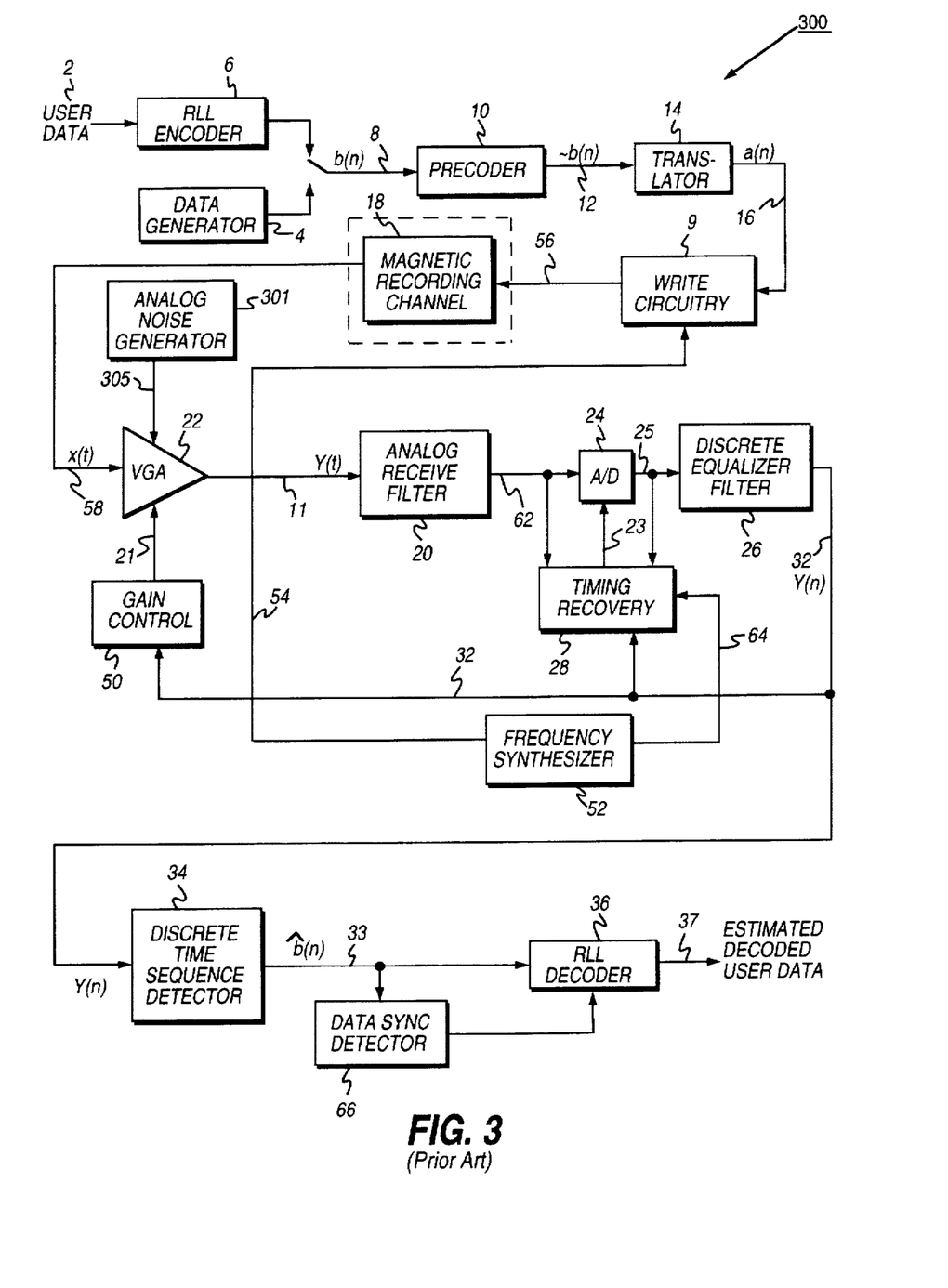
FIG. 3 shows a block diagram of a prior art sampled amplitude read channel including an analog noise generator for assisting in calibrating the read channel.

FIG. 3 shows a simplified block diagram of known sampled amplitude read channel 300 that includes analog noise generator 301 to enable calibration of the read channel. During calibration, a known binary sequence is read from magnetic recording channel 18 to produce analog signal x(t) on line 58. This signal passes through variable gain amplifier 22, analog receive filter 20, sampling device 24, and discrete equalization filter 26 to emerge as discrete-time sampled amplitude signal Y(n) on line 32. The overall transformation of the known binary sequence to signal Y(n) therefore incorporates effects such as distortion and intersymbol interference introduced by magnetic recording channel 18, as well as the effects of analog receive filter 20 and discrete equalization filter 26.

Typically, the BER of sampled amplitude read channels is low, so a reasonably large number of bits must be detected in order to make a reliable estimate of the BER. Thus, many bits must be written onto the magnetic recording medium and read back before a large enough number of errors occur. In addition, once an estimate of the BER is available, calibration may need to continue, requiring additional BER measurements, if the parameters of filter 20 and 26 have not converged. Such an iterative process can take an undesirably long time, and it is therefore advantageous to provide means to make a more rapid estimate of the BER.

To accomplish this, prior art read channel calibration means have included analog noise generator 301 to inject noise into variable gain amplifier 22, thereby increasing the error frequency artificially so that estimates of the BER can be made more rapidly.

Figure 4:
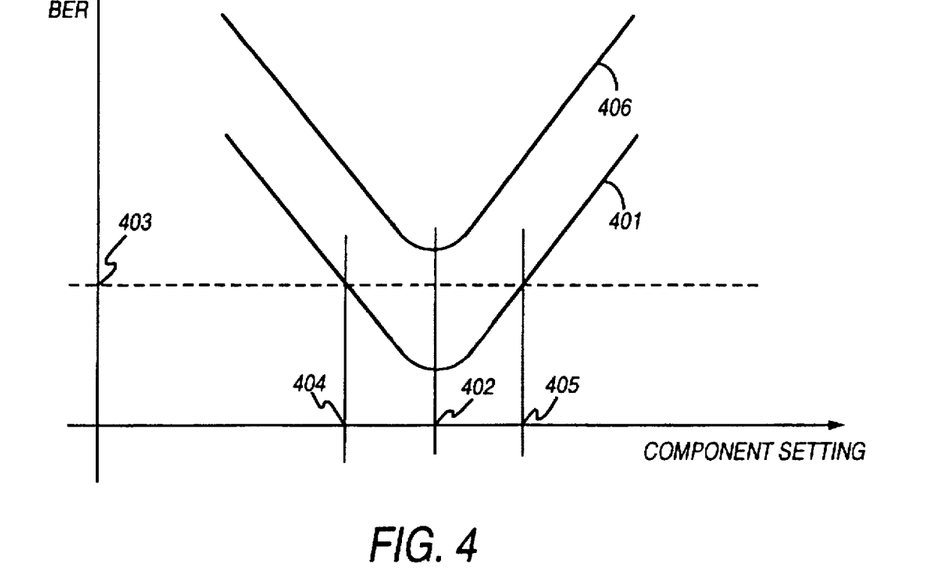
FIG. 4 is a set of graphs plotting a read channel's bit-error rate against a component setting, the set of graphs showing an effect on the bit-error rate caused by injecting noise into the read signal.

To explain further the purpose of including noise source 301, FIG. 4 shows an exemplary plot of the read channel's BER against a setting of some component value within the read channel. This component value, for example, may be a digital filter coefficient or it may be any other parameter that can be adjusted to influence the BER. Line 401 is the BER present when no noise is injected into the read channel. The optimal component setting is the one that corresponds to the minimum BER, and that minimum occurs at the component setting indicated by point 402. Suppose, however, that BERs below the rate indicated by minimum measurable level 403 cannot be measured quickly and reliably. In this case, the adjustment procedure will not be able to locate point 402 unambiguously; the procedure will only be able to deduce that the minimum BER corresponds to a component setting somewhere between points 404 and 405.

In contrast, Line 406 is the BER that results when noise is injected into the read channel. Advantageously in this case, the BER is increased so that it lies entirely above minimum measurable level 403. The BER can therefore be measured for all component settings, and the component can be set unambiguously to the value that yields the minimum BER. Once calibration is complete, the noise generator is disabled.

Figure 5:
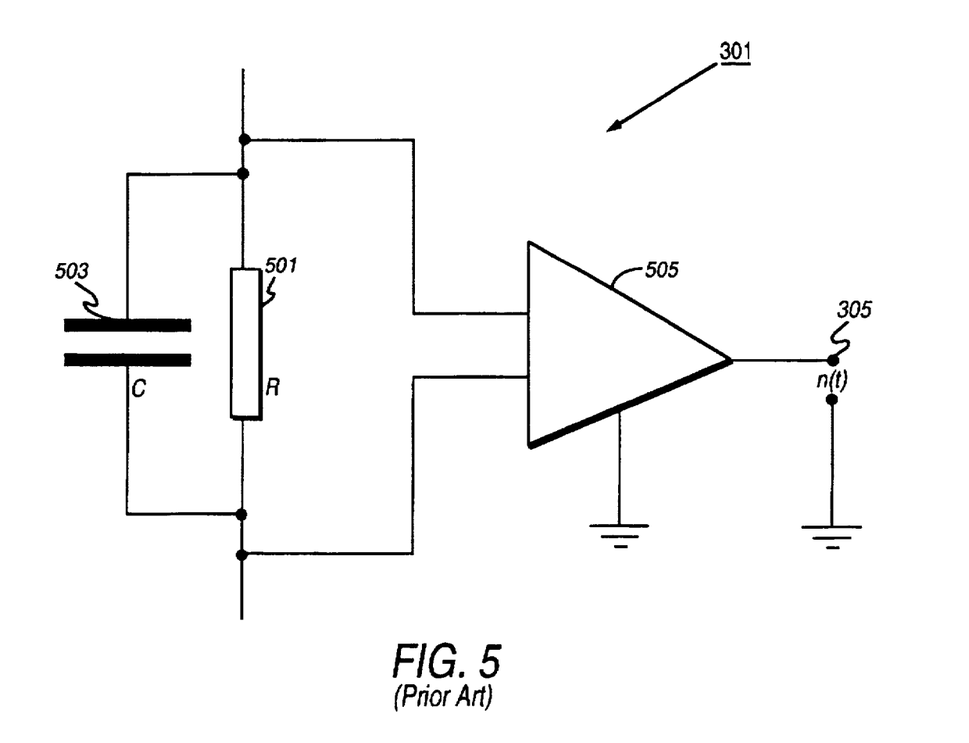
FIG. 5 shows a schematic circuit diagram of the analog noise generator in the read channel of FIG. 3.

Analog noise generator 301 is typically constructed using a circuit such as that shown in simplified form in FIG. 5. Noise generator 301 comprises resistor 501 that generates thermal noise, and amplifier 505 that amplifies the thermal noise to produce noise signal n(t) on line 305. Analog noise generator 301 has a number of disadvantages.

One disadvantage is that it is difficult to produce integrated high-gain wideband amplifiers that have sufficiently low input offsets. If the input offset is not sufficiently small, the output of the amplifiers have undesirably large dc offsets. A second disadvantage is that it is difficult to produce integrated high-gain wideband amplifiers that have a required gain certainty. If the gain is uncertain, the amplitude of the added noise is uncertain.

Thus, one of the objects of the present invention is to provide a sampled amplitude read channel with a noise generator that produces an adequate noise amplitude and sufficiently wide noise bandwidth that overcomes the disadvantages of a conventional analog noise generator.

Sampled Amplitude Read Channel with Digital Noise Generator

Figure 6:
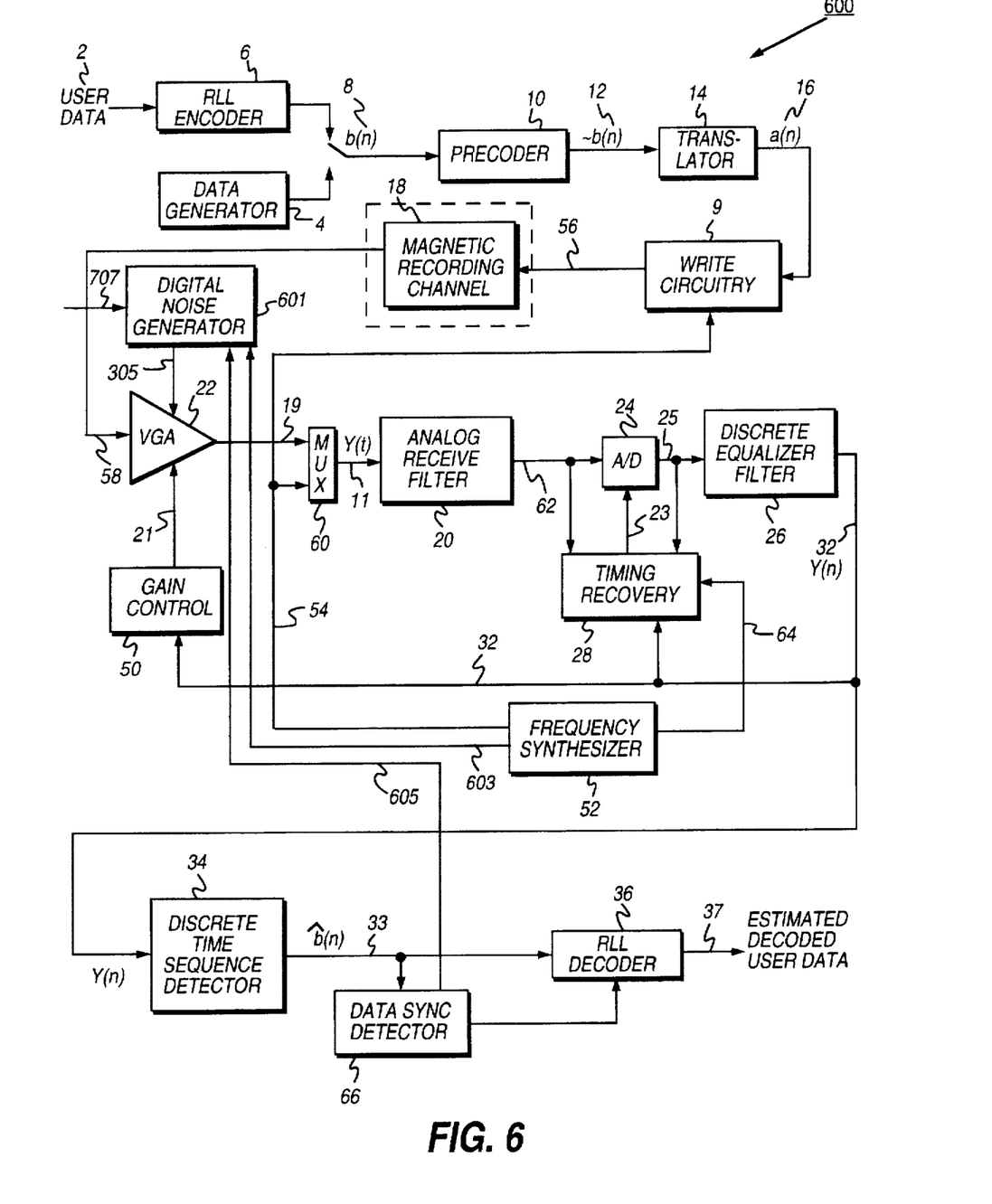
FIG. 6 shows a sampled amplitude read channel with a digital noise generator in accordance with the present invention.

FIG. 6 shows a block diagram of improved sampled amplitude read channel 600 in accordance with the present invention. In addition to the other components of conventional sampled amplitude read channel 300, the improvement shown in FIG. 6 includes digital noise generator 601 that injects analog noise signal n(t) over line 305 into variable gain amplifier 22 in place of analog noise generator 301 of FIG. 3.

Digital noise generator 601 is clocked over line 603 by frequency synthesizer 52 at a predetermined clocking rate, and is enabled or disabled by control input 707 and by data synchronization detector 66 over line 605. Such enabling and disabling insures that noise is neither injected into the read channel during acquisition, nor while the read channel is being synchronized, nor while the read head passes over embedded servo wedges in the magnetic storage medium, nor during normal operation.

Figure 7:
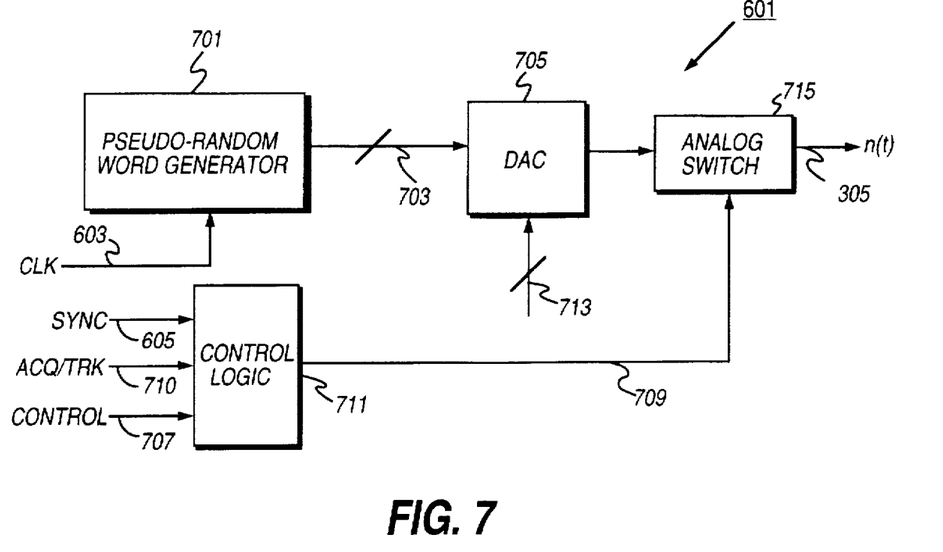
FIG. 7 shows a block diagram of a digital noise generator in accordance with the present invention, the digital noise generator comprising a pseudo-random digital word generator and a digital-to-analog converter.

FIG. 7 shows an illustrative block diagram of digital noise generator 601, the noise generator comprising pseudo-random digital word generator 701 and digital-to-analog converter (DAC) 705. Word generator 701 produces a stream of pseudo-random digital data on bus 703, and DAC 705 converts the stream into a pseudo-random continuous-time waveform on line 305. Although DAC 705 is preferably a digital-to-analog converter, in the context of the present invention, it may be any discrete-to-analog converter that, by definition, converts a discrete-time signal to a continuous-time signal.

Word generator 701 produces the stream at a rate that is determined by clock signal CLK on line 603 that is derived from frequency synthesizer 52. The output of noise generator 601 can be disabled by opening analog switch 715. As shown in FIG. 7, analog switch 715 is controlled by the output of control logic 711 which selectively disables the noise generator using a synchronization detect signal over line 605, an acquisition/tracking signal over line 710, and a user-programmable control signal over line 707 from other control circuits (not shown).

Preferably, digital noise generator 601 is disabled over line 707 during acquisition phases, during periods when the read channel seeks synchronization marks, during periods when the read head passes over embedded servo wedges, and during normal operation. However, control logic 711 is provided to disable noise generator 601 selectively so that aspects of acquisition, synchronization, and servo control may also be calibrated.

In the preferred embodiment, DAC 705 is a multiplying digital-to-analog converter that accepts a second digital input on bus 713. The second digital input controls the amplitude of the DAC's output, thereby allowing the BER to be set to a desired level.

Figure 8A:
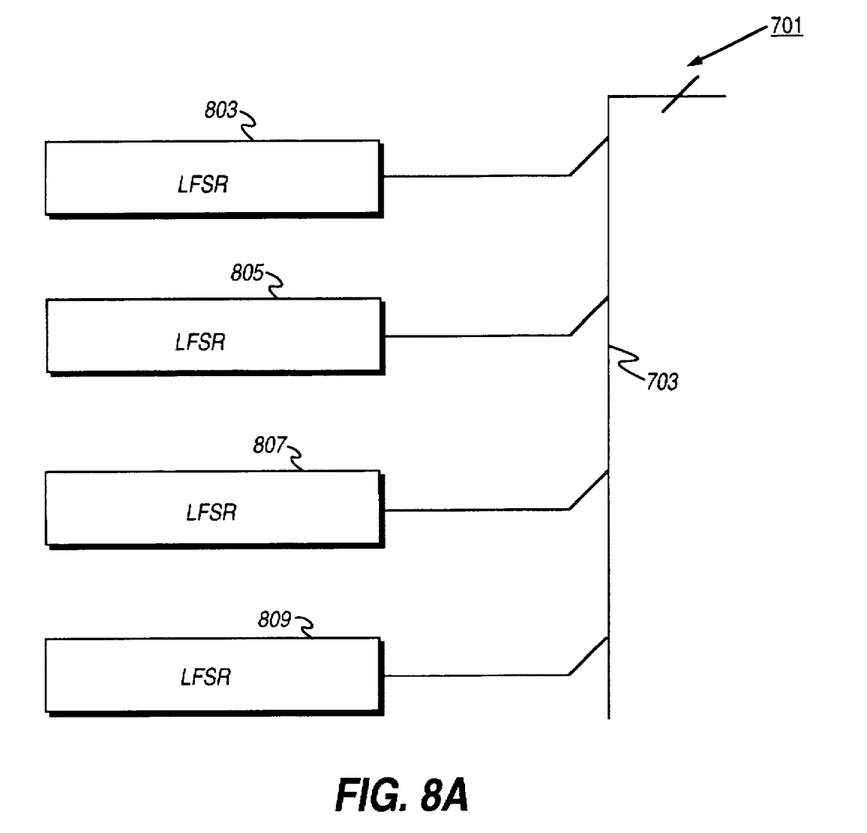
FIG. 8A shows a schematic diagram of the pseudo-random digital word sequence generator in the digital noise generator of FIG. 7, the word generator comprising a plurality of linear feedback shift registers (LFSRs)

Pseudo-random word generator 701 preferably comprises a set of linear feedback shift registers (LFSRs) as shown in FIG. 8A, with each LFSR designed to produce a different maximal-length pseudo-random binary sequence, and the pseudo-random binary sequences together forming the pseudo-random digital data stream on bus 703. In the preferred embodiment, there are four LFSRs, 803, 805, 807, and 809, that together form a four-bit-wide pseudo-random digital word. A larger or smaller number of LFSRs could be used.

Each LFSR comprises a number of stages. Different numbers of stages are chosen for each LFSR so that the period of the pseudo-random digital word stream is determined by the lowest common multiple of the periods of the individual pseudo-random binary sequences. In the preferred embodiment, the four LFSRs have 15, 16, 17, and 18 stages, respectively.

In the preferred embodiment, each LFSR implements a specific prime polynomial. In particular, the preferred prime polynomials are the following:

$$P_{15}(x) = x^{15} + x^{13} + x^9 + x^7 + x^5 + x^3 + x^2 + 1,$$

$$P_{16}(x) = x^{16} + x^{14} + x^{12} + x^{10} + x^8 + x^6 + x^3 + x + 1,$$

$$P_{17}(x) = x^{17} + x^{14} + x^{12} + x^{10} + x^8 + x^6 + x^4 + x^2 + 1,$$

$$P_{18}(x) = x^{18} + x^{16} + x^{14} + x^{12} + x^{10} + x^8 + x^4 + x^3 + 1,$$

Each LFSR is a digital circuit comprising a number of flip-flops and exclusive-or gates that, together with a set of initial states, implements the corresponding prime polynomial.

The preferred initial states for the LFSRs are the following:

For $P_5(x)$: $a_i(0)=0$ for all $i$, except $a_{14}(0)=1$.

For $P_6(x)$: $a_i(0)=0$ for all $i$, except $a_7(0)=1$.

For $P_{17}(x)$: $a_i(0)=0$ for all $i$, except $a_2(0)=1$.

For $P_{18}(x)$: $a_i(0)=0$ for all $i$, except $a_7(0)=1$.

The above description of the initial states is equivalent to the following alternative form:

100000000000000 for $P_{15}(x)$;
0000000010000000 for $P_{16}(x)$;
00001000000000000 for $P_{17}(x)$; and
100000000000000000 for $P_{18}(x)$.

The LFSRs are initialized at least once, but are preferably not re-initialized between adjustments of the read channel. This insures that the calibration does not always begin with the same pseudo-random sequence and its associated noise signal.

Figure 8B:
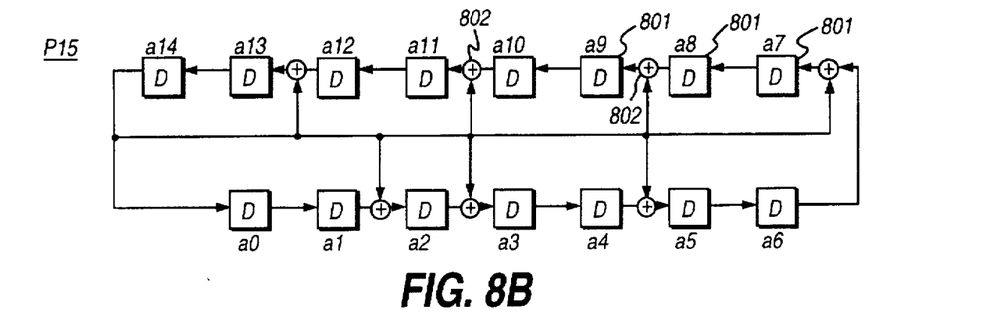
FIGS. 8B, 8C, 8D, and 8E show preferred embodiments of the LFSRs of FIG. 8A, the LFSRs producing pseudo-random binary sequences that together form the pseudo-random digital word sequence.

The LFSR digital circuits are designed from the prime polynomials according to conventional techniques. For example, consider the design of the circuit that implements $P_{15}(x)$. Define $$\phi_n(x) = \sum_{i=0}^{14} a_i(n)x^i = a_{14}(n)x^{14} + \ldots + a_1(n)x + a_0(n)$$

as the state of the circuit at time n, where the coefficients $a_i(n)$ are to be determined such that the desired prime polynomial is implemented. Since the preferred initial state for $P_{15}(x)$ is $a_i(0)=0$ for all $i$, except $a_{14}(0)=1$, the next state $\phi_{n+1}(x)$ is given by the recursive relation $$\phi_{n+1}(x) = x\phi_n(x) \oplus a_{14}(n)P_{15}(x)$$

where the symbol $\oplus$ represents the exclusive-or binary operation (modulo-2 addition). The coefficients can be found by substituting the definition of $\phi_n(x)$ into the recursive relation, and equating the coefficients of $\phi_n(x)$ with those of $\phi_{n+1}(x)$ to yield the following set of relations:

| | |
|---|---|
| $a_{14}(n+1) = a_{13}(n);$ | $a_{13}(n+1) = a_{12}(n) \oplus a_{14}(n);$ |
| $a_{12}(n+1) = a_{11}(n);$ | $a_{11}(n+1) = a_{10}(n) \oplus a_{14}(n);$ |
| $a_{10}(n+1) = a_9(n);$ | $a_9(n+1) = a_8(n) \oplus a_{14}(n);$ |
| $a_8(n+1) = a_7(n);$ | $a_7(n+1) = a_6(n) \oplus a_{14}(n);$ |
| $a_6(n+1) = a_5(n);$ | $a_5(n+1) = a_4(n) \oplus a_{14}(n);$ |
| $a_4(n+1) = a_3(n);$ | $a_3(n+1) = a_2(n) \oplus a_{14}(n);$ |
| $a_2(n+1) = a_1(n) \oplus a_{14}(n);$ | $a_1(n+1) = a_0(n);$ |
| $a_0(n+1) = a_{14}(n).$ | |

Figure 8C:
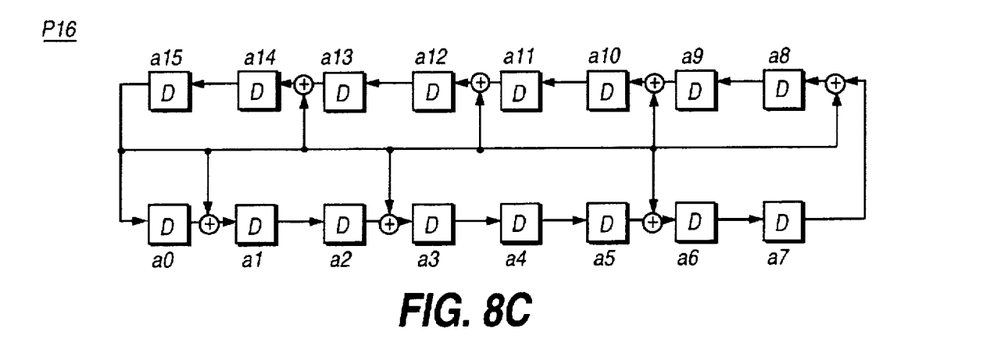
Figure 8D:
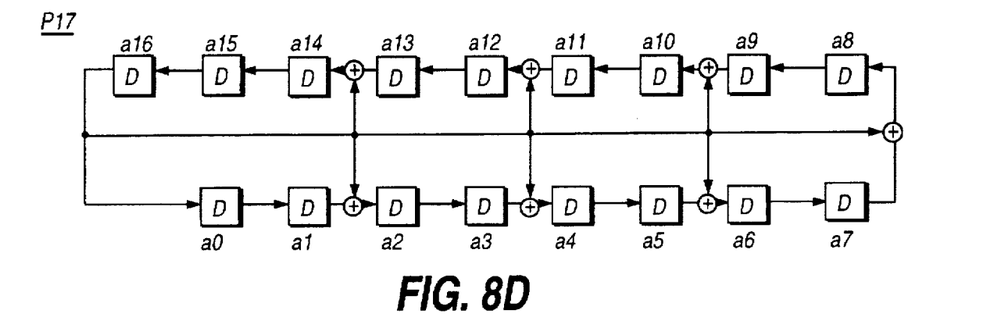
Figure 8E:
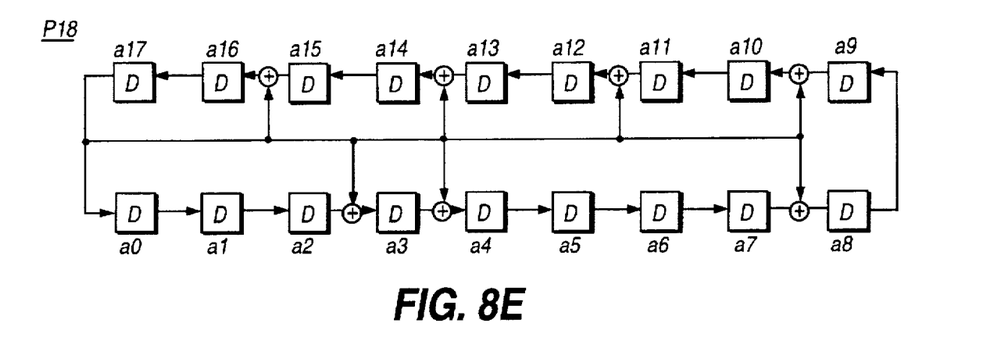

This set of relations is implemented with the circuit shown in FIG. 8B. Similarly, preferred embodiments of circuits that implement equivalent relations for $P_{16}(x)$, $P_{17}(x)$, and $P_{18}(x)$ are shown in FIGS. 8C, 8D, and 8E, respectively. Each circuit comprises a plurality of delay stages 801 and a plurality of modulo-2 adders 802 interconnected so as to realize the required prime polynomials. Methods for choosing appropriate interconnections to realize desired prime polynomials are well-known to those skilled in the art.

Unlike integrated analog noise generators whose output noise amplitude and bandwidth are critical functions of resistor parameters and amplifier gain-bandwidth product, the digital noise generator of the present invention provides a noise signal with amplitude substantially constant, and with a bandwidth determined principally by the rate of clock signal CLK 603.

The ability to specify and control the noise bandwidth is advantageous for the following reason: Sampling produces a signal that has a periodic spectrum, with period equal to the sampling frequency. If the sampling frequency is not high enough, spectral components from adjacent spectral periods overlap to produce a resultant sampled signal from which the original signal cannot be reproduced faithfully. Such overlapping is called aliasing.

Figure 9A:
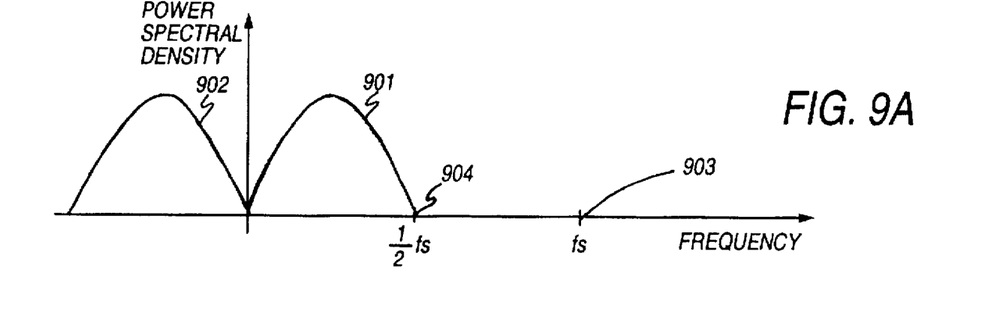
FIGS. 9A, 9B, 9C, and 9D illustrate the effect of aliasing in a sampled data system, and shows how the preferred bandwidth of the analog noise signal produced by the digital noise generator extends beyond the read channel's sample rate.
Figure 9B:
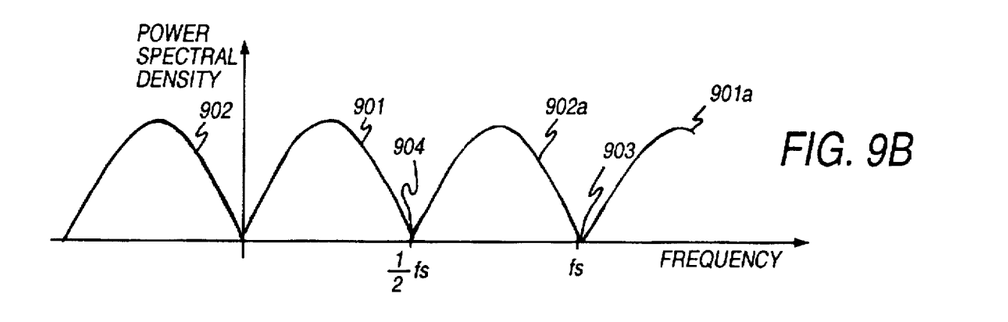
Figure 9C:
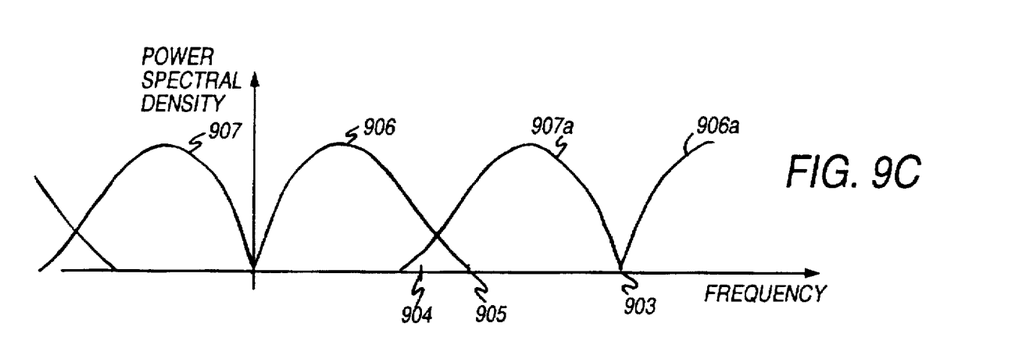

FIGS. 9A through 9C illustrate the effect of aliasing. FIG. 9A shows the spectrum of a typical analog baseband signal before sampling. Frequency band 901 represents the positive frequency components of the analog baseband signal, and frequency band 902 represents the negative frequency components.

FIG. 9B shows the resulting spectrum when the analog baseband signal is sampled at a sampling frequency $f_s=1/T$ that is indicated by point 903. The resulting sampled signal has a spectrum made up of a superposition of copies of the spectrum of the baseband signal, with each copy translated by a multiple of the sampling frequency $f_s$. Frequency bands 901a and 902a represent copies of frequency bands 901 and 902, respectively, with the copies translated by $f_s$. FIG. 9B shows a special case in which the bandwidth of the baseband signal (counting only positive frequencies) is just less than half of the sampling frequency $f_s$ (as in conventional PRML recording). Half the sampling frequency is indicated by point 904. In this special case, the highest frequency in frequency band 901 is just less than the lowest frequency of frequency band 902a. Thus, in this special case, and for all cases in which the bandwidth of the baseband signal is less than half of the sampling frequency, adjacent copies of the baseband signal spectrum do not overlap. Consequently, it is possible to recover an exact replica of the baseband signal (i.e., frequency bands 901 and 902 only) by passing the sampled signal through an appropriately designed lowpass filter.

In contrast, FIG. 9C shows the spectrum of a sampled signal in which the bandwidth of the baseband signal, indicated by point 905, is greater than half of the sampling frequency $f_s$, which is again represented by point 904. In this case, the upper part of frequency band 906 overlaps with the lower part of frequency band 907a, and it is not possible to recover an exact replica of the baseband signal (i.e., frequency bands 906 and 907 only).

In the context of the present invention, to prevent aliasing of the noise component of the continuous-time read signal, receive filter 20 of FIG. 6 removes high-frequency components from analog signal Y(t) on line 11. Recall that Y(t) comprises a data component and a wideband noise component. Ideally, filter 20 should insure that the signal on line 62 has a finite bandwidth, and analog-to-digital converter (or sampling device) 24 should be clocked at a frequency that is at least twice as high as the highest frequency component with appreciable energy on line 62. In practice, however, such perfect filtering is not achievable. Thus, aliasing of the noise component of the continuous-time read signal will be present in the sampled signal, and the read channel must be adjusted to provide optimal performance in this presence of this aliasing.

Figure 9D:
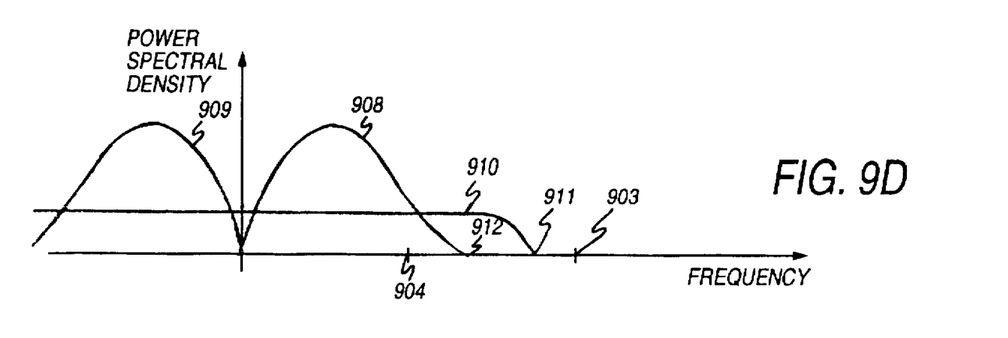

In order to insure that such adjustment can be made, the bandwidth of the added noise must extend at least to the maximum frequency that passes through filter 20 without sufficient attenuation; i.e., the noise bandwidth should be greater than the bandwidth of filter 20. Alternatively, providing that the bandwidth of Y(t) is greater than the bandwidth of filter 20, the noise bandwidth should be greater than the bandwidth of the filtered signal on line 62. This is illustrated in FIG. 9D which shows spectrum 908, 909 of the filtered signal on line 62 together with the spectrum 910 of the injected analog noise signal. Observe that the highest frequency of the analog noise signal, indicated by point 911, is higher than the highest frequency component (indicated by point 912) present in the filtered signal on line 62. Preferably, as shown in FIG. 9D, the spectrum of the analog noise signal is substantially flat over the entire bandwidth of the filtered signal on line 62. The analog noise signal is made to have such a bandwidth by clocking the digital noise generator at a rate that is higher than twice the filter bandwidth. In the preferred embodiment, the digital noise generator is clocked at twice the sampling rate over line 603 by frequency synthesizer 52 as shown in FIG. 6.

In addition to providing controlled bandwidth, the digital noise generator of the present invention advantageously also provides noise with a controlled probability distribution. More particularly, the probability distribution of the noise can be changed by varying the characteristics of DAC 705.

The probability distribution of the pseudo-random digital data stream on bus 703 is substantially uniform. That is, all four-bit words on the bus are substantially equally likely to occur. If a stream with uniform probability distribution is converted to a sampled amplitude analog waveform using a conventional DAC, the resulting waveform will also have a substantially uniform probability distribution. This occurs because there is a one-to-one mapping from the digital words at the input of the DAC to the amplitude of the waveform at the output of the DAC. In particular, each individual binary digit comprising the digital word is conventionally assigned a unique significance, and the DAC uses each bit's significance to map each word to a unique position on the real number line. In conventional DACs, if the bits are arranged according to their significance, each bit has twice the significance of one of its neighbors and half the significance of its other neighbor.

However, if the characteristics of a DAC are altered such that the mapping becomes many-to-one, causing certain output amplitudes to be generated by more than one input digital word, then a uniform input probability distribution may lead to a non-uniform output probability distribution. In the context of the present invention, in order to mimic actual noise that is present in the read channel, it is advantageous to generate a noise signal with a substantially Gaussian probability distribution, and it is well know that a Binomial probability distribution converges to a Gaussian probability distribution as the number of inputs increases.

Figure 10:
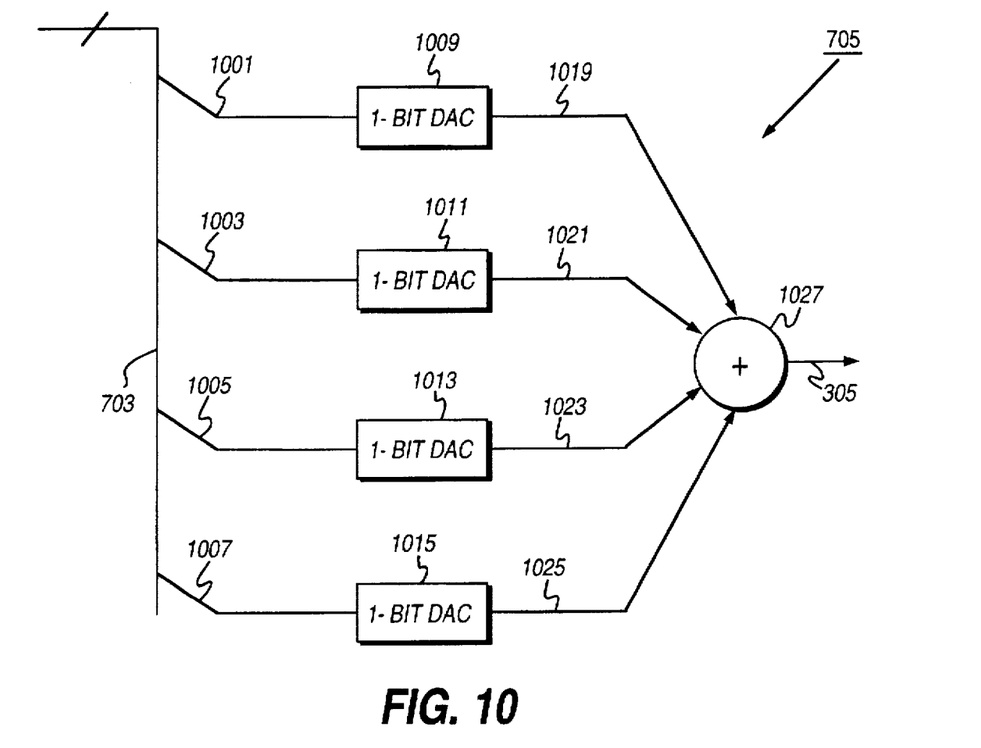
FIG. 10 shows a schematic diagram of the digital-to-analog converter in the digital noise generator of FIG. 7.

The present invention generates a noise signal with a substantially Gaussian probability distribution by attaching the same significance to each binary digit in the digital word. FIG. 10 shows DAC 705 in accordance with the present invention for producing a noise signal with a substantially Binomial probability distribution. DAC 705 comprises several (preferably four) substantially identical 1-bit DACs 1009, 1011, 1013, and 1015, and analog adder 1027. Preferably, the 1-bit DACs are current-mode devices so that the speed of DAC 705 is maximized. Inputs 1001, 1003, 1005, and 1007 to the 1-bit DACs are coupled to the four-bit digital word on bus 703. For the same binary inputs, all 1-bit DACs produce substantially the same amplitude analog output. These outputs (appearing on lines 1019, 1021, 1023, and 1025) are summed by analog adder 1027 to produce the analog noise signal on line 305. Preferably, adder 1027 comprises a junction of lines 1019, 1021, 1023, and 1025.

Observe that the mapping from the words on bus 703 to the amplitude on line 305 is many-to-one. For example, four-bit words 0001, 0010, 0100, and 1000 all produce an output with an amplitude of one unit. For a uniform probability distribution input, the probability of one of these four words occurring is $4/16=1/4$. Similarly, words 0011, 0101, 0110, 1001, 1010, and 1100 all produce an output with an amplitude of two units, and the probability of one of these six words occurring is $6/16=3/8$. In general, for a uniform probability distribution input applied to an n-bit converter of the form shown in FIG. 10, the output will have a probability distribution of the form $$p(i) = \binom{n}{i}\left(\frac{1}{2}\right)^n = \frac{n!}{(n-i)!i!}\left(\frac{1}{2}\right)^n.$$

Figure 11:
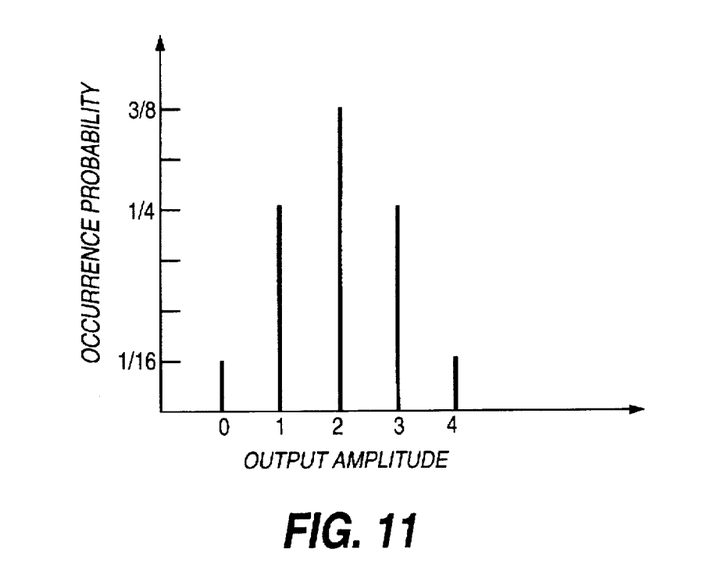
FIG. 11 shows a graph of the probability distribution function of the noise generated by the digital noise generator of FIG. 7.

This is a special case of the Binomial distribution. For n=4, the probability distribution of the sampled amplitude waveform will be as shown in FIG. 11.

It is well known that as n becomes large, the Binomial distribution tends to a Gaussian distribution. Thus, the output of DAC 705 can, after appropriate translation, be used to provide noise with a probability distribution that is approximately Gaussian. Translation may be necessary to insure that the mean amplitude of the noise is zero. Such translation can be performed using any method that is known to those skilled in the art. For example, translation may be accomplished by adding a constant offset in adder 1027, or by using a standard level shifting circuit, or (least preferably) by using capacitive coupling. The preferred embodiment avoids translation by making the output of each 1-bit DAC equal to a constant +a if the input is a "1," or −a if the input is a "0."

In addition to its use in sampled amplitude read channels, the present invention can also be used in peak-detection read channels. Typically, in such read channels, a differentiator processes the analog read signal to produce a derivative signal that has zero crossings coinciding with peaks (both positive and negative) in the analog read signal, and has substantially zero amplitude when the analog read signal has a substantially constant amplitude. The peak detection read channel also comprises a threshold qualification circuit that works together with the differentiator such that the combination of the differentiator and the threshold qualification circuit produces an output pulse when the analog read signal has a positive or a negative peak. The output pulse triggers a phase-locked loop that generates a clock signal. Desirably, a specified edge of the clock signal should be substantially synchronized with the specified points in the analog read signal. For example, the rising edge of the clock pulse may be preferably be synchronized with the center of a peak in the analog read signal.

As in sampled amplitude read channels, the noise generator of the present invention may be used in such peak detection read channels to assist in adjusting the read channel parameters, including phase-locked loop parameters, for optimal performance.

Thus, in summary, we have presented a sampled amplitude read channel with a digital noise generator that enables rapid calibration of the read channel components such that optimal operation may be achieved. The digital noise generator of the present invention has a substantially constant amplitude and controlled probability distribution, and does not depend critically on amplification of thermal noise.

While preferred and alternative embodiments have been presented, it will be obvious to those skilled in the art that various changes to form and detail may be made to the invention without departing from its scope. For example, the digital noise generator could be implemented in the write circuitry rather than the read circuitry, in which case the analog noise signal could, for example introduce a jitter in the square-wave write signal. This, and other like modifications, are within the scope of the present invention.

TABLE 1

| Channel | Transfer Function | Dipulse Response |
|---------|-------------------|------------------|
| PR4     | $(1-D)(1+D)$      | 0, 1, 0, −1, 0, 0, 0, ... |
| EPR4    | $(1-D)(1+D)^2$    | 0, 1, 1, −1, −1, 0, 0, ... |
| EEPR4   | $(1-D)(1+D)^3$    | 0, 1, 2, 0, −2, −1, 0, ... |

We claim:

1. A sampled amplitude read channel for reading digital data from a storage medium, the read channel being equalized according to a desired channel pulse response, the read channel comprising:

(a) a sampling device for sampling an analog read signal from a read head positioned over the storage medium to generate a sequence of discrete time sample values;

(b) a discrete time noise generator for generating an analog noise signal used to increase a bit-error rate to facilitate calibration of the read channel, the discrete time noise generator comprising:

(i) a sequence generator that generates a pseudo-random sequence of discrete time values, comprising a plurality of linear feedback shift registers, wherein: each one of the plurality of linear feedback shift registers provides a corresponding one binary digit output sequence to form a plurality of binary digit output sequences; and the plurality of binary digit output sequences together form the pseudo-random sequence of discrete time values; and (ii) a discrete-to-analog converter that converts the pseudo-random sequence of discrete time values into the analog noise signal; and (c) a discrete time detector for detecting the digital data from the sequence of discrete time sample values, wherein:

the storage medium comprises a plurality of sectors;

the plurality of linear feedback shift registers are initialized at least once; and the read channel is capable of reading successive sectors without re-initialization of the plurality of linear feedback shift registers.

2. The sampled amplitude read channel as recited in claim 1, wherein the four linear feedback shift registers comprise:

(a) a first linear feedback shift register having fifteen stages;

(b) a second linear feedback shift register having sixteen stages;

(c) a third linear feedback shift register having seventeen stages; and (d) a fourth linear feedback shift register having eighteen stages.

3. The sampled amplitude read channel as recited in claim 2, wherein:

(a) the first linear feedback shift register implements a first prime polynomial of the form $P_{15}(x)=x^{15}+x^{13}+x^{11}+x^9+x^7+x^5+x^3+x^2+1$;

(b) the second linear feedback shift register implements a second prime polynomial of the form $P_{16}(x)=x^{16}+x^{14}+x^{12}+x^{10}+x^8+x^6+x^3+x+1$;

(c) the third linear feedback shift register implements a third prime polynomial of the form $P_{17}(x)=x^{17}+x^{14}+x^{12}+x^{10}+x^8+x^6+x^4+x^2+1$; and (d) the fourth linear feedback shift register implements a fourth prime polynomial of the form $P_{18}(x)=x^{18}+x^{16}+x^{14}+x^{12}+x^{10}+x^8+x^4+x^3+1$.

4. The sampled amplitude read channel as recited in claim 3, wherein:

(a) the first linear feedback shift register has an initial state 100000000000000;

(b) the second linear feedback shift register has an initial state 0000000010000000;

(c) the third linear feedback shift register has an initial state 00001000000000000; and (d) the fourth linear feedback shift register has an initial state 100000000000000000.

5. A sampled amplitude read channel for reading digital data from a storage medium, the read channel being equalized according to a desired channel pulse response, the read channel comprising:

(a) a sampling device for sampling an analog read signal from a read head positioned over the storage medium to generate a sequence of discrete time sample values;

(b) a discrete time noise generator for generating an analog noise signal used to increase a bit-error rate to facilitate calibration of the read channel, the discrete time noise generator comprising:

(i) a sequence generator that generates a pseudo-random sequence of discrete time values; and (ii) a discrete-to-analog converter that converts the pseudo-random sequence of discrete time values into the analog noise signal; and (c) a discrete time detector for detecting the digital data from the sequence of discrete time sample values, wherein:

the analog read signal is passed through a filter to produce a filtered signal that has a bandwidth;

the sequence generator is clocked at a noise generation rate relative to a sampling frequency of the sampling device such that the analog noise signal has a noise bandwidth that is at least as wide as the bandwidth of the filtered signal.

6. The sampled amplitude read channel as recited in claim 5, wherein the analog noise signal has a noise spectrum that is substantially constant up to the bandwidth of the filtered signal.

7. The sampled amplitude read channel as recited in claim 6, wherein:

(a) the discrete time sample values are sampled from the analog read signal at a sampling rate; and (b) the noise generation rate is twice the sampling rate.

8. The sampled amplitude read channel as recited in claim 5, wherein a probability distribution of the analog noise signal approximates a Gaussian distribution.

9. The sampled amplitude read channel as recited in claim 8, wherein the Gaussian distribution is approximated by generating a substantially binomial distribution.

10. A sampled amplitude read channel for reading digital data from a storage medium, the read channel being equalized according to a desired channel pulse response, the read channel comprising:

(a) a sampling device for sampling an analog read signal from a read head positioned over the storage medium to generate a sequence of discrete time sample values;

(b) a discrete time noise generator for generating an analog noise signal used to increase a bit-error rate to facilitate calibration of the read channel, the discrete time noise generator comprising:

(i) a sequence generator that generates a pseudo-random sequence of discrete time values, comprising a plurality of linear feedback shift registers, wherein:

each one of the plurality of linear feedback shift registers provides a corresponding one binary digit output sequence to form a plurality of binary digit output sequences; and the plurality of binary digit output sequences together form the pseudo-random sequence of discrete time values; and (ii) a discrete-to-analog converter that converts the pseudo-random sequence of discrete time values into the analog noise signal; and (c) a discrete time detector for detecting the digital data from the sequence of discrete time sample values, wherein:

the plurality of linear feedback shift registers implement a first and a second polynomial; and the first and second polynomials have unequal degrees.

* * * * *

UNITED STATES PATENT AND TRADEMARK OFFICE
CERTIFICATE OF CORRECTION

PATENT NO. : 5,786,951
DATED : July 28, 1998
INVENTOR(S) : Welland, et al.

It is certified that error appears in the above-identified patent and that said Letters Patent is hereby corrected as shown below:

Column 11, Line 21: Replace the equation "$P_{15}(x)=x^{15}+x^{13}+x^9+x^7+x^5+x^3+x^2+1$"
with the following: --$P^{15}(x)=x^{15}+x^{13}+x^{11}+x^9+x^7+x^5+x^3+x^2+1$--;

Line 34: Replace "For $P_5(x)$:"
with --For $P_{15}(x)$:--;

Line 36: Replace "For $P_6(x)$:"
with --For $P_{16}(x)$:--;

Line 38: Replace "except $a_2(0)=1$"
With --except $a_{12}(0)=1$--;

Line 39: Replace "except $a7\!\!/(0)=1$"
With --except $a_{17}(0)=1$--.

Signed and Sealed this

Twenty-ninth Day of June, 1999

Attest:

Attesting Officer

Q. TODD DICKINSON

Acting Commissioner of Patents and Trademarks